Dec. 15, 1953  W. ARMSTRONG  2,662,615
HYDRAULIC SHOCK ABSORBER FOR VEHICLES
Filed Sept. 22, 1950  2 Sheets-Sheet 1

Inventor
William Armstrong
By
John James Victor Armstrong
Attorney

Dec. 15, 1953  W. ARMSTRONG  2,662,615
HYDRAULIC SHOCK ABSORBER FOR VEHICLES
Filed Sept. 22, 1950  2 Sheets-Sheet 2

Inventor
William Armstrong
By
John James Victor Armstrong
Attorney

Patented Dec. 15, 1953

2,662,615

UNITED STATES PATENT OFFICE 2,662,615

HYDRAULIC SHOCK ABSORBER FOR VEHICLES

William Armstrong, Eastgate, Beverley, England, assignor to Armstrong's Patents Company Limited, Eastgate, Beverley, England Application September 22, 1950, Serial No. 186,294

Claims priority, application Great Britain September 27, 1949

7 Claims. (Cl. 188—100)

This invention concerns hydraulic shock absorbers for vehicles and is more particularly concerned with shock absorbers of the so-called telescopic type in which a piston fixed to an axially extending piston rod is displaceable in an inner cylinder which is surrounded by an annular space disposed between the inner cylinder and an outer cylinder.

An object of the present invention is to provide a construction whereby the inner cylinder may be sealed against leakage between its end and a piston rod guide notwithstanding a slight deformation of the piston rod or lack of alignment between the piston and the piston rod.

It has normally been usual to engage the substantially cylindrical external surface of the piston rod guide within the outer cylinder, thereby rigidly defining its position relative to the axis of said outer cylinder.

According to the present invention, however, the piston rod guide is arranged so as to be capable of slight displacement relative to the axis of the outer cylinder to allow self-alignment of the piston rod to take place. Preferably, the substantially cylindrical external surface of the piston rod guide is slightly tapered or otherwise shaped so that a slight clearance obtains between it and the outer cylinder for the major portion of its length. For example, the piston rod guide may be made to engage the outer cylinder over between 10% and 15% of its length. The clearance over the remainder of the length preferably increases towards the two extreme ends of the piston rod guide.

The invention will be described further by way of example with reference to the drawings accompanying the provisional specification, in which.

Figure 1:
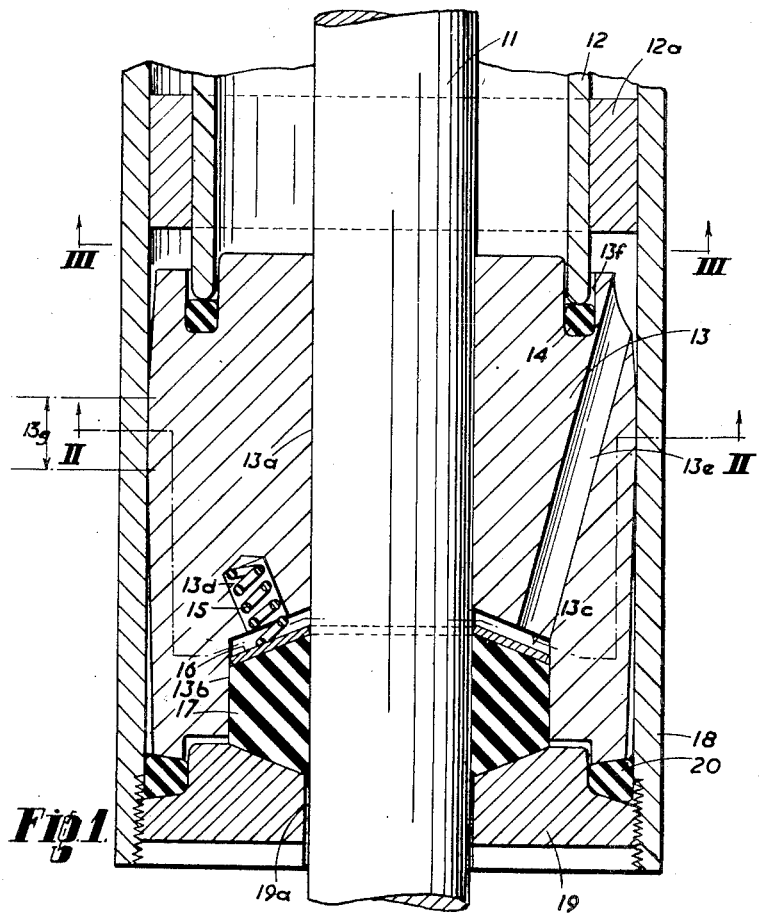
Fig. 1 is an inverted fragmentary vertical section.
Figure 2:
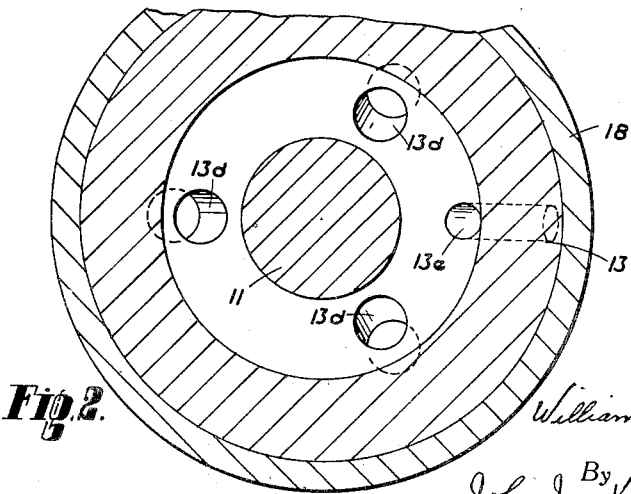
Fig. 2 is a section on the line II—II of Fig. 1.
Figure 3:
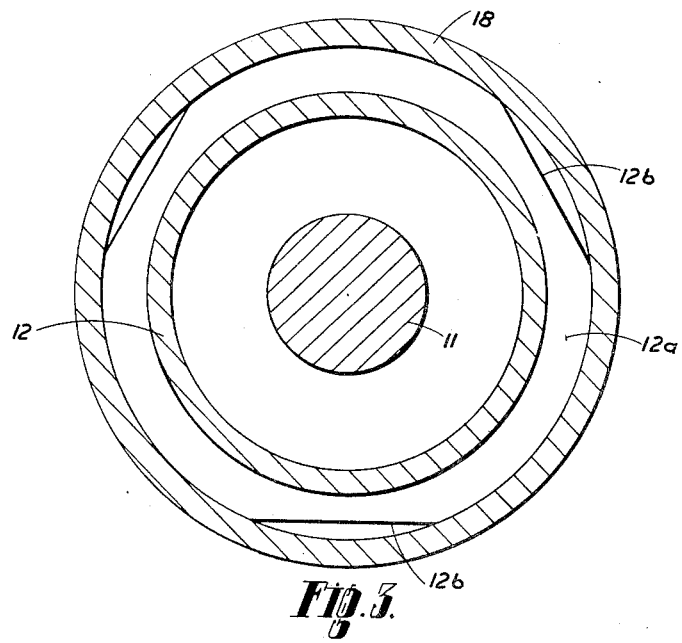
Fig. 3 is a section on the line III—III of Fig. 1.

In a hydraulic telescopic shock absorber, a piston, not shown, is fixed to a piston rod 11. The piston is longitudinally displaceable within an inner cylinder 12, said inner cylinder having a collar or ring 12a suitably secured thereto at a point adjacent the end of a piston rod guide 13. The ring 12a serves to support the inner cylinder and has three equally spaced flats 12b on its outer periphery to allow working fluid or air to pass freely from the piston rod guide 13 to the reservoir. The piston rod guide 13 is axially bored at 13a to receive the piston rod 11 and is counterbored at 13b. There is an oblique shoulder 13c between the bore and the counterbore. There are 3 oblique blind bores 13d disposed at equal intervals around the shoulder 13c and an oblique bore 13e extends between the shoulder and the outer substantially cylindrical surface of the guide 13.

The end of the guide 13, adjacent to the inner cylinder 12, is annularly grooved at 13f. In this groove there is a sealing ring 14 which is engaged by the end of the inner cylinder 12, thereby sealing the inner cylinder to the guide 13. A spring 15 is disposed in each bore 13d. These springs bear against a dished washer 16 so as to apply pressure to a rubber packing 17 which is largely contained within the counterbore 13b. The piston rod guide 13 is positively engaged with the inner surface of an outer cylinder 18 over approximately 12% of its length as indicated at 13g. Over the remainder of its length there is an increasing clearance between its substantially cylindrical surface and the interior of the outer cylinder 18, reaching a maximum at the two extreme ends of the piston rod guide.

A plug 19 having a clearance hole 19a to accommodate the piston rod 11, is threadedly engaged with the upper end region of the outer cylinder 18 and is so disposed as to provide an abutment for the packing 17 and to compress a sealing ring 20 between an oblique surface near its periphery and the uppermost outer end portion of the piston rod guide 13.

Now if, due to some external force or because of some defect in manufacture, the piston rod 11 is bent, sealing of the inner cylinder 12 will be maintained and smooth guiding action will take place since the piston rod guide 13 will align itself within the outer cylinder by reason of the clearance over the major portion of its length.

As a result of this realignment, the rubber sealing rings 14 and 20 become slightly distorted but they still maintain their sealing properties. The bore 13e prevents an excessive pressure being built up between the shoulder 13c and the washer 16 as a result of piston rod displacement and leakage between the rod and the guide 13.

It will be appreciated that in theory a point contact or circular line contact should be made between the piston rod guide and the outer cylinder but in practice it has been found that realignment can effectively take place if a surface contact between the piston rod guide and the outer cylinder takes place over a substantial fraction of the axial length of the guide.

I claim:

1. A piston rod guide for use in a telescopic hydraulic shock absorber for vehicles having an outer cylinder, an inner cylinder disposed within said outer cylinder and defining an annular reservoir space between the cylinders, a piston displaceable axially within the inner cylinder, and a piston rod fixed to the piston and extending axially out of said inner cylinder; said piston rod guide having a passage for the piston rod and adapted to guide and seal the piston rod in displacement along said passage, said guide also having an outer surface adapted to engage frictionally the outer cylinder over a portion of its length, said guide being tapered from said engaged portion toward each end so as to allow slight displacement of the guide relative to the axis of said outer cylinder.

2. A piston rod guide as set forth in claim 1 in which the piston rod guide is adapted to engage the outer cylinder over between 10% and 15% of its length.

3. A piston rod guide for use in a telescopic hydraulic shock absorber for vehicles having an outer cylinder, an inner cylinder disposed within said outer cylinder and defining an annular reservoir space between the cylinders, a piston displaceable axially within the inner cylinder, and a piston rod fixed to the piston and extending axially out of said inner cylinder; said piston rod guide having an axially located bore extending therethrough adapted to receive a piston rod and also having a counterbore located at one end of the guide, said guide having an outer surface adapted to engage frictionally the outer cylinder but shaped to allow slight displacement of the guide relative to the axis of said outer cylinder.

4. A piston rod guide as set forth in claim 3, having an oblique shoulder between the bore and the counterbore, said shoulder being provided with three oblique blind bores disposed at equal intervals therearound, a rubber packing largely contained within the counterbore, a spring in each of said blind bores, and a dished washer, said springs being adapted to bear against said washer to exert pressure on said rubber packing.

5. A piston rod guide as set forth in claim 4, in which a second oblique bore extends between the oblique shoulder and the outer substantially cylindrical surface of the piston rod guide.

6. A piston rod guide for use in a telescopic hydraulic shock absorber for vehicles having an outer cylinder, an inner cylinder disposed within said outer cylinder and defining an annular reservoir space between the cylinders, a piston displaceable axially within the inner cylinder, and a piston rod fixed to the piston extending axially out of said inner cylinder; said piston rod guide having a passage for the piston rod and adapted to guide and seal the piston rod in displacement along said passage, said guide also having an outer surface adapted to engage frictionally the outer cylinder but shaped to allow slight displacement of the guide relative to the axes of said outer cylinder, one end of the piston rod guide having an annular groove therein, and a sealing ring of suitable material contained in said groove, said ring being adapted to be engaged by one end of the inner cylinder of such a shock absorber to seal said cylinder to said guide.

7. A piston rod guide for use in a telescopic hydraulic shock absorber for vehicles having an outer cylinder, an inner cylinder disposed within said outer cylinder and defining an annular reservoir space between the cylinders, a piston displaceable axially within the inner cylinder, and a piston rod fixed to the piston and extending axially out of said inner cylinder; said piston rod guide having a passage for the piston rod and adapted to guide and seal the piston rod in displacement along said passage, said guide also having an outer surface adapted to engage frictionally the outer cylinder but shaped to allow slight displacement of the guide relative to the axis of said outer cylinder, a rubber packing located at one end of said guide, said packing defining in part the passage for the piston rod, and a sealing ring for sealing the piston rod guide with respect to the outer cylinder, said sealing ring being located at the same end of the guide as is the rubber packing, and means independent of said guide for retaining the rubber packing and the sealing ring in position.

WILLIAM ARMSTRONG.

References Cited in the file of this patent

UNITED STATES PATENTS

| Number | Name | Date |
|---|---|---|
| Re. 21,908 | Beecher | Sept. 30, 1941 |
| 2,134,072 | Christenson | Oct. 25, 1938 |
| 2,263,284 | Beecher | Nov. 18, 1941 |
| 2,369,007 | Beecher | Feb. 6, 1945 |
| 2,472,840 | Lewton | June 14, 1949 |
| 2,498,802 | Funkhouser | Feb. 28, 1950 |
| 2,511,260 | Heinrich | June 13, 1950 |
| 2,599,477 | Patriquin | June 3, 1952 |

FOREIGN PATENTS

| Number | Country | Date |
|---|---|---|
| 277,862 | Great Britain | Sept. 29, 1927 |
| 670,128 | Great Britain | 1952 |